(12) United States Patent
Meehan et al.

(10) Patent No.: US 11,462,990 B2
(45) Date of Patent: Oct. 4, 2022

(54) INTEGRATED SWITCHING REGULATOR DEVICE USING MIXED-CORE INDUCTORS

(71) Applicant: University of Limerick, Limerick (IE)

(72) Inventors: Patrick Meehan, Pallaskenry (IE);
Eamon O'Malley, Claremorris (IE);
Karl Rinne, Youghal (IE)

(73) Assignee: UNIVERSITY OF LIMERICK, Limerick (IE)

( * ) Notice: Subject to any disclaimer, the term of this patent is extended or adjusted under 35 U.S.C. 154(b) by 0 days.

(21) Appl. No.: 16/768,021

(22) PCT Filed: Nov. 28, 2018

(86) PCT No.: PCT/EP2018/082773
§ 371 (c)(1),
(2) Date: May 28, 2020

(87) PCT Pub. No.: WO2019/105968
PCT Pub. Date: Jun. 6, 2019

(65) Prior Publication Data
US 2020/0366200 A1    Nov. 19, 2020

(30) Foreign Application Priority Data
Nov. 28, 2017    (GB) ...................................... 1719765

(51) Int. Cl.
*H02M 1/14*        (2006.01)
*H02M 3/158*       (2006.01)
*H02M 1/00*        (2006.01)

(52) U.S. Cl.
CPC .............. *H02M 1/14* (2013.01); *H02M 1/008* (2021.05); *H02M 3/158* (2013.01)

(58) Field of Classification Search
CPC ............. H02M 1/0003; H02M 1/0048; H02M 1/0054; H02M 1/008; H02M 1/0083;
(Continued)

(56) References Cited

U.S. PATENT DOCUMENTS 4,419,606 A * 12/1983 Tsuzurabara ............ H01J 23/15
                                                    315/39.51
4,916,380 A *  4/1990 Burroughs .............. H02M 1/14
                                                    323/266
(Continued)

FOREIGN PATENT DOCUMENTS

DE           4437560 A1    5/1996

OTHER PUBLICATIONS

PCT/EP2018/082773. Int'l Search Report (dated Mar. 7, 2019).
(Continued)

*Primary Examiner* — Jeffrey A Gblende
(74) *Attorney, Agent, or Firm* — Loza & Loza, LLP; Anthony Smyth

(57) ABSTRACT

An integrated switching regulator device has a switching mode regulator comprising an input voltage source and a switching circuit coupled to the input voltage source configured to generate a pulsed voltage from the input voltage. A low pass filter is coupled to the switching regulator and is configured to filter the pulsed voltage to provide a regulated voltage to a load. The low pass filter comprises at least two LC stages, wherein the first LC stage comprises an air cored inductor and each subsequent LC stage comprises a non-air cored inductor. The switching circuit comprises two or more switching elements configurable to operate at a switching frequency of several megahertz.

17 Claims, 5 Drawing Sheets

(58) Field of Classification Search
CPC ...... H02M 1/0093; H02M 1/12; H02M 1/126; H02M 1/14; H02M 1/143; H02M 1/40; H02M 3/02; H02M 3/04; H02M 3/10; H02M 3/155; H02M 3/156; H02M 3/158; H02M 3/1582; H02J 1/02
See application file for complete search history.

(56) References Cited

U.S. PATENT DOCUMENTS

| | | | | |
|---|---|---|---|---|
| 6,404,301 | B1* | 6/2002 | Park | H01J 23/15 333/182 |
| 10,284,091 | B2* | 5/2019 | Kuroda | H02M 3/1582 |
| 2002/0175627 | A1* | 11/2002 | Murao | H01J 25/587 315/39.51 |
| 2006/0238129 | A1* | 10/2006 | Ochiai | H01J 23/15 315/39.51 |
| 2012/0212305 | A1* | 8/2012 | Shafer | H03H 7/0115 333/174 |
| 2014/0210429 | A1* | 7/2014 | Dally | H02M 3/1588 323/225 |
| 2014/0210434 | A1* | 7/2014 | Dally | G05F 1/10 323/271 |
| 2014/0218001 | A1* | 8/2014 | Dally | H02M 1/00 323/285 |
| 2014/0225579 | A1 | 8/2014 | Dally | |
| 2014/0232360 | A1* | 8/2014 | Dally | G05F 1/563 323/266 |
| 2014/0232361 | A1* | 8/2014 | Dally | H02M 3/156 323/271 |
| 2015/0091539 | A1 | 4/2015 | Norling | |
| 2018/0034436 | A1* | 2/2018 | Masuda | H03H 7/0115 |
| 2019/0182957 | A1* | 6/2019 | Sturcken | H01F 27/24 |

OTHER PUBLICATIONS

Gonzalez et al. "Impact of output filter layout in the conducted emissions of an on-board DC/DC converter for 'More Electrical Aircraft'". 2017 IEEE Int'l Conf. on Compatibility, Power Electronics and Power Engineering (Apr. 4, 2017).

* cited by examiner

A small capacitor, C4, of very low ESL is placed in parallel to C1. The overall ESL of C1 and C4 is less than C1 alone.

INTEGRATED SWITCHING REGULATOR DEVICE USING MIXED-CORE INDUCTORS

CLAIM OF PRIORITY

This application is the U.S. National Stage of International Patent Application No. PCT/EP2018/082773 filed Nov. 28, 2018, which claims priority to GB1719765.8 filed Nov. 28, 2017, both of which are incorporated herein by reference in their entirety.

FIELD

The disclosure is concerned with providing an integrated switching regulator.

BACKGROUND

Switching regulators are commonly used in order to provide a regulated power supply to a load. However, one drawback associated with the use of switching regulators is that these regulators introduce power supply ripple by virtue of their operational characteristic. In order to attenuate the ripple introduced by a switching regulator, the output of a regulator is typically coupled to a low-pass filter, with the output of the low-pass filter then coupled to a load.

There has been some research into increasing the switching frequency of conventional switching regulators, which is typically around 600 kHz. However, heat loss increases with frequency in a near-linear relationship. Thus, as an example, if all other conditions remain constant, an increase in the switching frequency of a regulator from 1 MHz to 10 MHz will result in an increase in the temperature of the inductor in the low-pass filter of the regulator circuit by approximately ten fold, such that the inductor core becomes too hot due to the higher frequency AC content.

It will be appreciated that this heat loss is detrimental to the efficiency and the reliability of the operation of a switching regulator. Thus, heat loss presents a major impediment to increasing the switching frequencies of operation of switching regulators.

It is accordingly an object of the present disclosure to overcome at least one of the above mentioned problems associated with the use of switching regulators.

SUMMARY

According to the invention there is provided, as set out in the appended claims, an integrated switching regulator device or circuit comprising:
 a switching regulator comprising:
 an input voltage source; and
 a switching circuit coupled to the input voltage source to generate a pulsed voltage from the input voltage, the switching circuit comprises at least two switching elements configurable to operate at a switching frequency; and
 a low pass filter coupled to the switching regulator configured to filter the pulsed voltage to provide a regulated voltage to a load; wherein the low pass filter comprises at least two LC stages, each LC stage comprising an inductor and a capacitor connected together, the inductor of the first LC stage comprises an air cored inductor and the inductor of each subsequent LC stage comprises a non-air cored inductor.

In one embodiment the non-air cored inductor comprises an inductor comprising a ferrite core.

In one embodiment the non-air cored inductor comprises an inductor comprising a metal composite core.

In one embodiment the switching elements comprise a wide bandgap FET.

In one embodiment the wide bandgap FET comprises a gallium nitride (GaN) device.

In one embodiment the wide bandgap FET comprises a Silicon Carbide (SiC) device.

In one embodiment the device comprises a surface mount integrated circuit.

In one embodiment the integrated circuit comprises a module housing the switching regulator die and the low pass filter.

In one embodiment the low pass filter is mounted to a laminate which also supports the switching regulator.

In one embodiment the inductors of each LC stage of the low pass filter are mounted onto a single constructed unit.

In one embodiment the switching elements comprise a first switch and a second switch, wherein the first switch and the second switch are configured to alternatively switch between an open and a closed state to generate the pulsed voltage from the input voltage at their common node.

In one embodiment the pulsed voltage comprises one of: a rectangular or a square voltage waveform.

In one embodiment the load comprises an analog or a mixed signal load.

In one embodiment the air-cored inductor stage comprises a first capacitor arranged in parallel.

In one embodiment a second capacitor is arranged in parallel with the first capacitor to minimise any stray inductance.

In one embodiment the second capacitor capacitance is selected to be substantially smaller than the first capacitor.

In another embodiment there is provided a method of operating an integrated switching regulator device comprising the steps of:
 connecting a switching circuit to an input voltage source to generate a pulsed voltage from the input voltage, the switching circuit comprises at least two switching elements configurable to operate at a switching frequency; and
 coupling a low pass filter to the switching regulator and configured to filter the pulsed voltage to provide a regulated voltage to a load; wherein the low pass filter comprises at least two LC stages, each LC stage comprising an inductor and a capacitor connected together, the inductor of the first LC stage comprises an air cored inductor and the inductor of the or each subsequent LC stage comprises a non-air cored inductor.

In a further embodiment there is provided a low pass filter circuit comprising at least two LC stages, each LC stage comprising an inductor and a capacitor connected together, the inductor of the first LC stage comprises an air cored inductor and the inductor of each subsequent LC stage comprises a non-air cored inductor; and the filter circuit is coupled to a switching regulator configured to filter a pulsed voltage to provide a regulated voltage to a load. In one embodiment the low pass filter circuit is coupled with a switching regulator.

BRIEF DESCRIPTION OF THE DRAWINGS

The disclosure will be more clearly understood from the following description of an embodiment thereof, given by way of example only, with reference to the accompanying drawings, in which.

DETAILED DESCRIPTION OF THE DRAWINGS

The present disclosure discloses an integrated switching regulator which is suitable for operation at high switching speeds.

Figure 1:
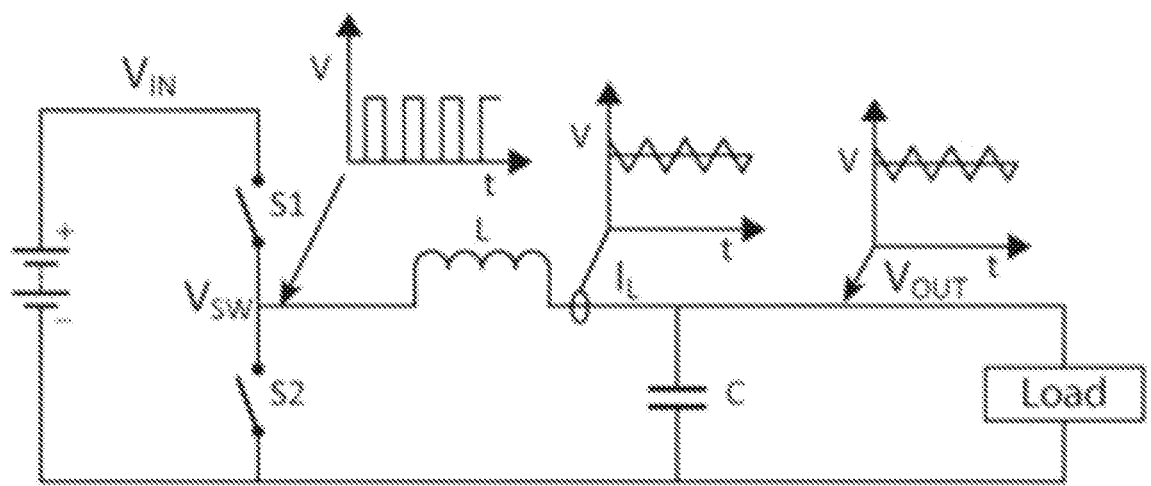
FIG. 1 shows one embodiment of a conventional filtered buck regulator coupled to a load.

FIG. 1 shows an example of such a switching regulator circuit, where the switching regulator is a buck regulator. In the embodiment shown, the buck mode regulator comprises an input voltage source, $V_{in}$, and a pair of switching elements, switches S1 and S2. A low-pass filter is coupled to the shared common node of the two switches, $V_{sw}$. The low-pass filter comprises an inductor L and a capacitor C connected together. The output filtered signal from the lowpass filter, $V_{out}$, is then provided as the regulated DC voltage to the load. A closed feedback loop maintains the DC level at $V_{out}$ independent of the load.

During operation of the circuit, switches S1 and S2 are configured to alternatively switch between an open and a closed state at a particular switching frequency, in order to generate a pulsed voltage waveform from the DC input voltage $V_{in}$ at their shared common node, $V_{sw}$. The low-pass filter is then able to recover the average DC value of the pulsed waveform presented by the switches S1 and S2, and supply it as the regulated DC voltage to the load.

The values of both the inductor L and the capacitor C of the low-pass filter set the low-pass corner-frequency, fc. The value of the corner-frequency relative to the fundamental switching frequency of the switching regulator, $f_{sw}$, determines the amount of attenuation seen by the switching frequency and its harmonics. This, in turn, is the primary determining factor for undesired ripple seen on the desired, resultant regulated DC voltage, $V_{out}$ at the load. Accordingly, the values of the inductor and capacitor in the low-pass filter of the switching regulator circuit are typically set as large as possible, within the boundary constraints of physical size and degraded impulse response of the power supply. In addition, the switching frequency of the switching regulator is typically set as high as possible, in order to obtain the maximum attenuation for any given LC product.

The inductor core used to implement the low-pass filter in a switching regulator circuit is typically formed from a material which comprises a composite of metals or forms of ferrite material, to increase the achievable physical-density for a given inductance value. However, one drawback associated with the use of a ferrite or composite core inductor is that the core heats up when AC currents are presented to the inductor. The magnetic-domains require volumetric space within the core material. However, when the domains are quickly realigned by an applied AC current to the inductor, a heat loss occurs in the core.

According to a preferred embodiment of the invention there is provided a switching regulator having an input voltage source and a switching circuit coupled to the input voltage source. A low pass filter is coupled to the switching regulator to provide a regulated voltage to a load. The switching circuit comprises at least two switching elements configurable to operate at a desired switching frequency. The low pass filter comprises at least two LC stages, wherein the first LC stage comprises an air cored inductor and the or each subsequent LC stage comprises a non-air cored inductor. In the context of this invention an air core can be used to describe any core that can comprise a material that is non-ferromagnetic. For example non-ferromagnetic material can be a ceramic, plastic etc.

Figure 2:
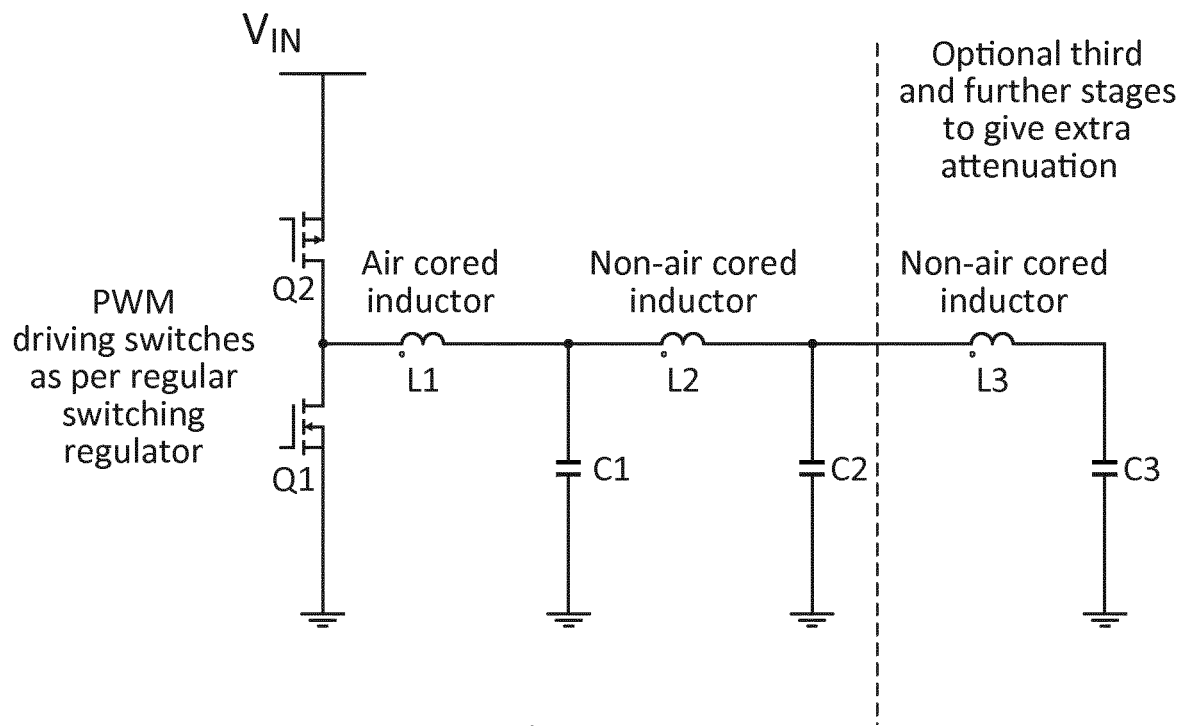
FIG. 2 shows one embodiment of the integrated switching regulator device of the present disclosure.

FIG. 2 shows one embodiment of the integrated device of the present disclosure. The switching elements of the switching regulator comprises a first switch Q1 and a second switch Q2 coupled to the input voltage source. The switches Q1 and Q2 can comprise any transistor which is suitable for operating at high switching speeds, typically of the order of several hundred KHz or higher if required. In one embodiment, each switch comprises a wide bandgap FET, such as for example a gallium nitride FET or a silicon carbide FET.

In the embodiment shown, the low pass filter comprises three LC stages. The first LC stage comprises an inductor L1 and a capacitor C1, wherein the inductor L1 comprises an air cored inductor. The second LC stage comprises an inductor L2 and a capacitor C2, wherein the inductor L2 comprises a non-air cored inductor. Similar to the second LC stage, the third LC stage comprises an inductor L3 and a capacitor C3, wherein the inductor L3 comprises a non-air cored inductor.

The non-air cored inductors may be fabricated from any suitable inductor material, such as for example a material which comprises a composite of metals or forms of ferrite material.

Through the use of an air cored inductor for the first LC stage of the low-pass filter, the majority of the AC related heat can be dealt with in the first LC stage of the filter, due to the fact that air cored inductors do not suffer from the heating associated with AC currents. The non-air cored inductors in the subsequent LC stages can then provide the balance of the filtering of the ripple from the switching regulator. Thus, the configuration of the low-pass filter of the present disclosure overcomes the problem of heat loss which occurs when a low-pass filter comprising a single LC stage with a ferrite core inductor is coupled to a switching regulator which is operating at high switching frequencies.

One drawback of air cored inductors is that they are substantially larger in volume, for a given inductance value, than the equivalent ferrite or composite-cored inductor. However, through the use of non-air cored inductors for the second and any subsequent LC stages of the low-pass filter of the device of the present disclosure, the overall area required to implement the low-pass filter in the integrated device of the present disclosure is minimised.

It should be understood that it is not necessary for the inductor L1 of the first LC stage of the low-pass filter to provide the total amount of ripple attenuation required by the switching regulator, but only to provide a gross-reduction of the ripple. Each subsequent LC filter stage can provide further attenuation of the ripple, but without having to be designed to handle the heat that comes with the large AC signal which is present at the first LC filter stage.

Due to the configuration of the low-pass filter of the switching regulator device of the present disclosure, the only heating that occurs in the inductors of the low-pass filter is a very small amount related to the DC resistance of the inductors, as well as a very small amount of residual AC core-heating seen by the second and any subsequent LC filter stage. However, it should be appreciated that the air-cored first LC stage of the filter typically reduces the AC content of the power rail to be generated by a factor of 60 dB (i.e. 1000), as an example.

It will be appreciated that the number of subsequent LC stages incorporated into a particular integrated device can be determined based on the level of attenuation required for the application with which the switching regulator device is to be used.

In one embodiment of the invention, the air-cored inductor of the first LC stage and the non-air cored inductor of the subsequent stages are of substantially the same inductance value. Example inductor values would be 100 nH. If the capacitor was chosen to be 47 uF then this would give a ½ Pi(SqRtLC) corner frequency of 73.4 kHz.

Figure 3A:
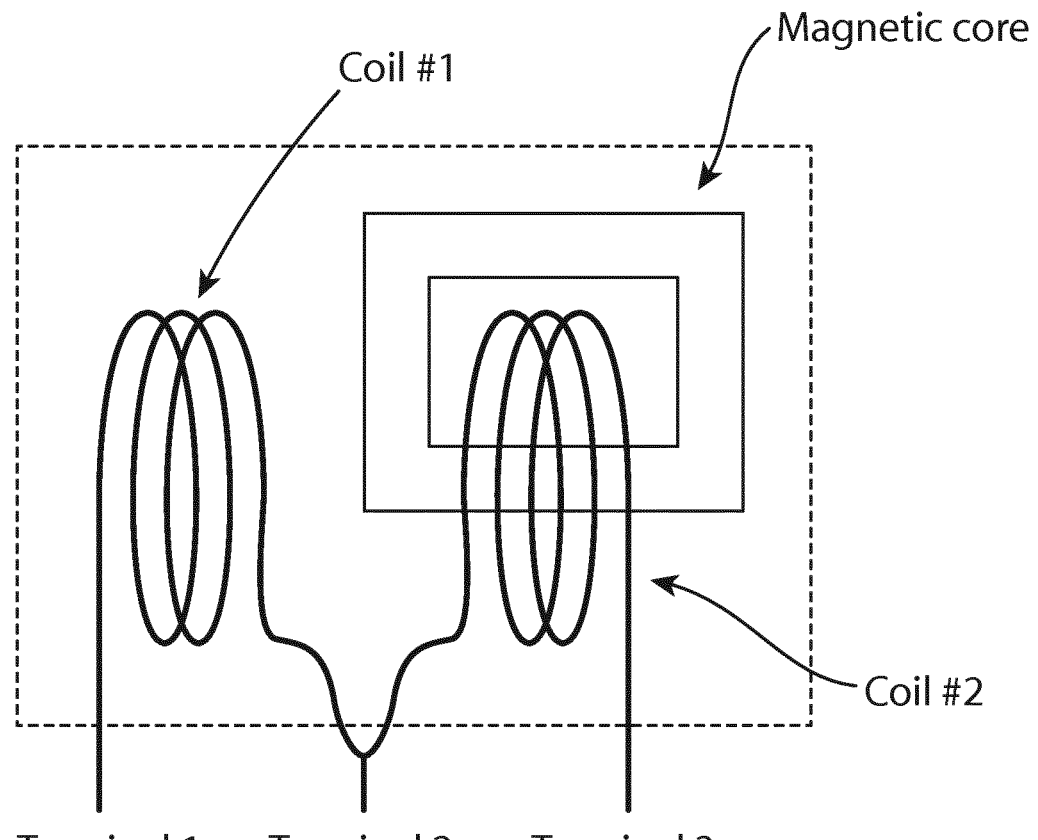
FIG. 3A shows one embodiment of an implementation of the low-pass filter of the switching regulator device of FIG. 2.
Figure 3B:
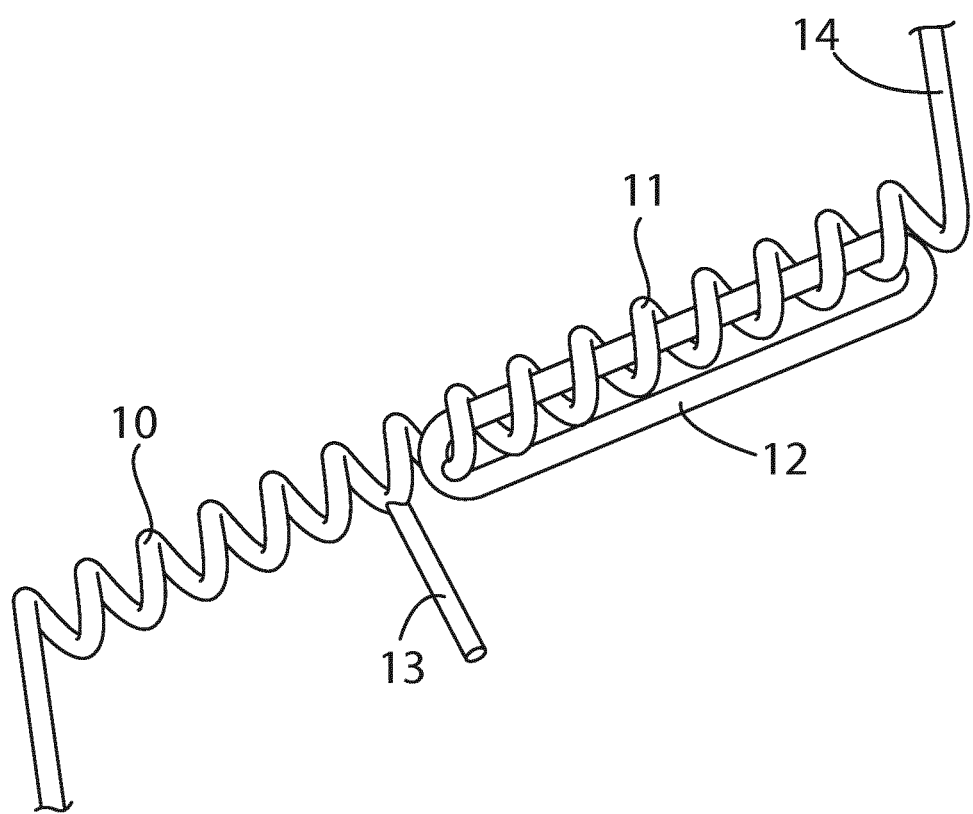
FIG. 3B shows a perspective view of the inductors of the embodiment of FIG. 3A.

The low-pass filter of the switching regulator device of the disclosure can be implemented in a number of different ways. FIG. 3A shows one exemplary implementation of the filter. In this implementation, the inductors of each LC stage of the low pass filter are mounted onto a single constructed unit. FIG. 3B shows a perspective view of the inductors of the embodiment of FIG. 3A. The air cored inductor of the first LC stage comprises a first coil 10, while the non-air cored inductor of the second LC stage comprises a second coil 11 with a magnetic core 12, for example formed of ferrite material. The first stage inductor can be accomplished by tapping off a second node 13 connection where the air-core ends and the ferromagnetic core begins. The second stage inductor can be made by taking that connection at the end of the air core and a second node 14 at the end of the ferromagnetic core.

In the embodiment of the disclosure described with reference to FIG. 2, the switching circuit comprises two switching elements. However, in an alternative embodiment of the disclosure, the switching circuit may comprise a single switching element. Furthermore, while in the described embodiment, the switching regulator comprises a buck regulator, in an alternative embodiment, the switching regulator may comprise a boost regulator or a buck-boost regulator or other topologies.

As noted above, the components of the switching regulator device of the present disclosure are housed as an integrated circuit. The housing can be any form of integrated, self-contained package. For example, in one embodiment, the integrated circuit is configured such that the filter circuitry is mounted to a laminate which also supports the switching regulator die. The laminate is then encapsulated within, for example, a mold cap. Wire bonds connect the circuitry to the package's leads. Alternatively, the integrated circuit may comprise a module-type package, where the switching regulator die and the filter circuitry are housed within a module.

In another alternate embodiment of the device, the filter circuitry is mounted to the lead frame of the integrated circuit package, which may be specifically designed or modified to accommodate the circuitry.

Figure 4:
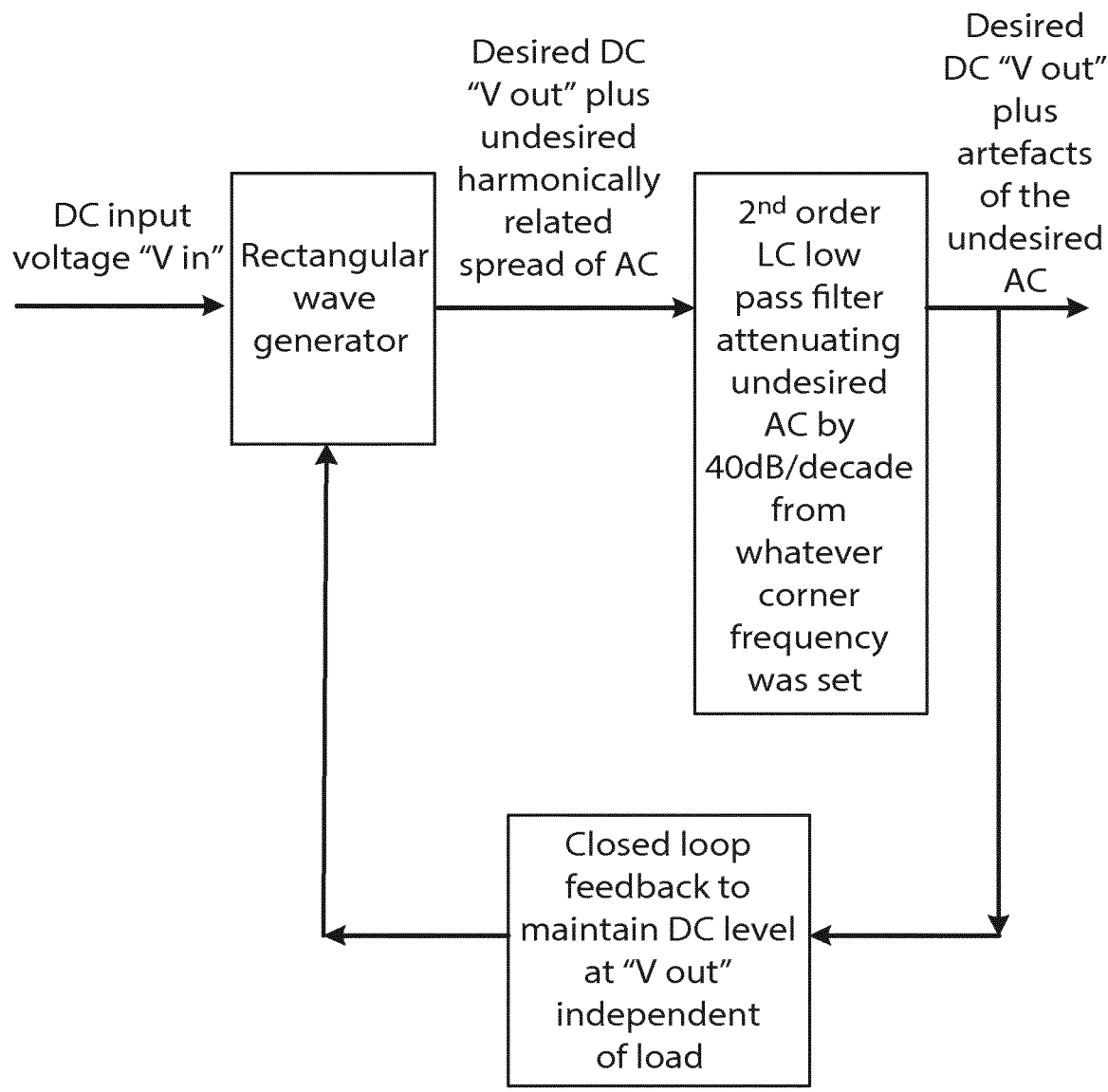
FIG. 4 illustrates the operation of the switch mode power supply device of FIG. 2.

The operation of the switching regulator device of FIG. 2 is illustrated in FIG. 4. During operation, switch Q1 and switch Q2 of the switching regulator are pulse width modulated to alternatively switch between an open and a closed state at a predetermined switching speed. This transforms the input DC voltage into a pulsed voltage waveform at the common node of the two switches, which pulse may be rectangular or square. The voltage waveform includes the desired DC supply voltage, as well as an undesired harmonically related spread of AC voltage. This output voltage from the switching regulator is input into the low-pass filter. The air cored inductor of the first LC stage of the low-pass filter deals with the majority of the AC related heat. Each subsequent LC filter stage then attenuates the undesired AC voltage, such that the voltage at the output of the final LC stage of the filter does not contain AC noise above a predetermined threshold value. The voltage at the output of the final LC filter stage provides the regulated DC voltage to the load. The closed feedback loop maintains the DC level of the output voltage independent of the load.

Figure 5:
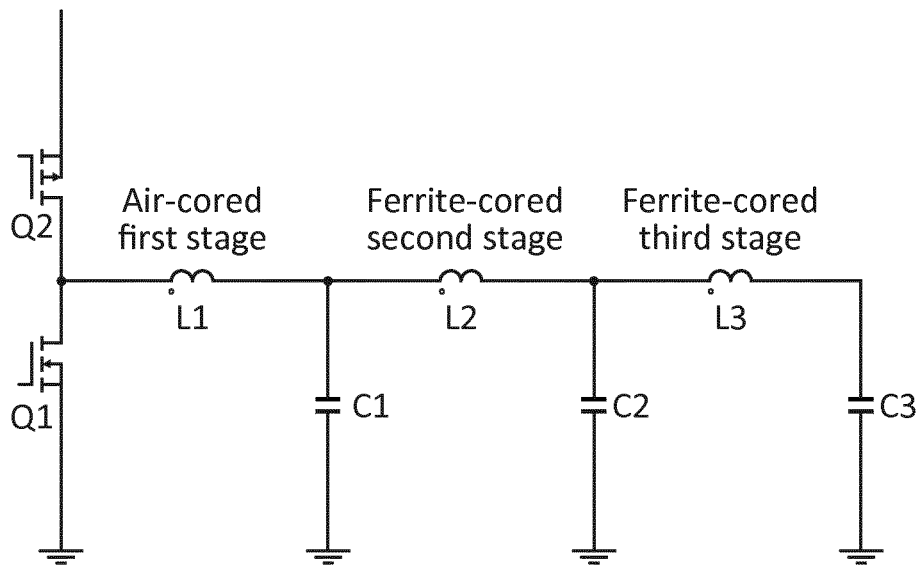
FIG. 5 illustrates a three-stage post regulator filter comprising a plurality of LC stages.

FIG. 5 illustrates a three-stage post regulator filter comprising a plurality of LC stages and similar to FIG. 2. FIG. 5 shows a three-stage LC filter placed after a switching regulator with a LC-LC-LC configuration. The first inductor, L1, is an air-cored inductor and selected will be of low inductance value relative to the metal or ferrite-cored L2 or L3, because L1 uses air. If C1 has significant stray inductance ("ESL") then an inductive potential-divider formed between L1 and C1's ESL that can limit stage one attenuation.

Figure 6:
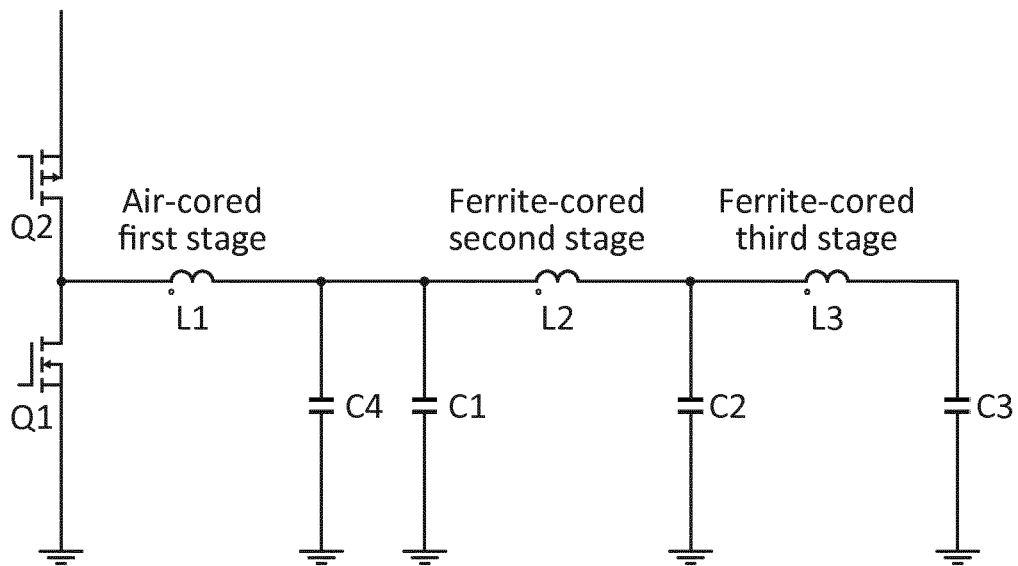
FIG. 6 illustrates a three-stage post regulator filter comprising a plurality of LC stages and having a capacitor arranged in parallel on one of the stages.

FIG. 6, similar to FIG. 5, illustrates a three-stage post regulator filter comprising a plurality of LC stages with an optional additional capacitor C4 placed in parallel. In FIG. 6 a very low value capacitor, C4, is added and selected with a very low ESL inductance. Due to its small physical size, the capacitor will not add much to the combined capacitance of C1+C4, but will reduce the parallel overall inductance of (C1 plus C4) ESL values. This in turn makes the air-cored inductor, L1, more effective as an attenuator. For example, call the combined stray inductance of the two capacitors, (C1+C4)=Lstray. Then the maximum attenuation achievable by the L1 stage is (Lstray/(L1+Lstray). By making Lstray as small as possible using the present invention is useful for operation where L1 is going to be small to start with, by virtue of the high frequencies achievable from using wide bandgap switches. It will be appreciated that at lower frequencies where L1 was going to be big, the stray inductance would be of less consequence to the overall filter attenuation achievable.

The switching regulator device of the present disclosure provides a number of advantages over conventional switch mode power supplies. Due to the design of the low-pass filter, it is possible to provide an integrated switching regulator which can operate at high switching frequencies in the order of several MHz. By providing an integrated device having a multi LC stage low-pass filter where the inductor of the first LC stage comprises an air-cored inductor and the inductor of each subsequent LC stage comprises a non-air cored inductor, inductor core-heating due to high switching frequencies is substantially eliminated. It will be appreciated that in the context of the present invention the term 'low-pass' filter should be interpreted broadly and used to encompass a filter circuit capable of operating in an integrated switching regulator device.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An integrated switching regulator device comprising:
   a switching regulator comprising:
      an input voltage source; and
      a switching circuit coupled to the input voltage source to generate a pulsed voltage from the input voltage, the switching circuit comprises a plurality of switching elements configurable to operate at a switching frequency; and
   a low pass filter configured to provide a desired amount of ripple attenuation in a regulated voltage output to a load, the low pass filter including:
      a first inductor and a first capacitor connected together and configured to provide a first LC stage, an input of the first LC stage being coupled to an output of the switching regulator, wherein the first inductor comprises an air core; and
      a second inductor and a second capacitor connected together and configured to provide a second LC stage, an input of the second LC stage being coupled to an output of the first LC stage, wherein the second inductor comprises a metal composite core or a ferrite core,
   wherein the first LC stage is configured to provide a gross attenuation of an alternating current (AC) signal present in the output of the switching regulator, whereby the air core of the first inductor prevents heat generation associated with the gross attenuation of the AC signal, and wherein the second LC stage is configured to further attenuate the AC signal.

2. The integrated switching regulator device of claim 1, wherein the low pass filter further includes:
   a third inductor and a third capacitor connected together and configured to provide a third LC stage, an input of the third LC stage being coupled to an output of the second LC stage, wherein the third inductor comprises a metal composite core or a ferrite core, and wherein the third LC stage is configured to further attenuate the AC signal by an amount sufficient to obtain the desired amount of ripple attenuation.

3. The integrated switching regulator device of claim 1, wherein at least one of the plurality of switching elements comprises a wide bandgap gallium nitride (GaN) field effect transistor.

4. The integrated switching regulator device of claim 1, wherein at least one of the plurality of switching elements comprises a wide bandgap Silicon Carbide (SiC) field effect transistor.

5. The integrated switching regulator device of claim 1, wherein the device comprises a surface mount integrated circuit.

6. The integrated switching regulator device of claim 5, wherein the surface mounted integrated circuit comprises a module housing a switching regulator die and the low pass filter.

7. The integrated switching regulator device of claim 5, wherein the low pass filter is mounted to a laminate which also supports the switching regulator.

8. The integrated switching regulator device of claim 5, wherein the inductors of each LC stage of the low pass filter are mounted onto a single constructed unit.

9. The integrated switching regulator device of claim 1, wherein the switching elements comprise a first switch and a second switch, wherein the first switch and the second switch are configured to alternatively switch between an open and a closed state to generate the pulsed voltage from the input voltage at a common node.

10. The integrated switching regulator device of claim 1, wherein the pulsed voltage comprises one of: a rectangular or a square voltage waveform.

11. The integrated switching regulator device of claim 1, wherein the load comprises an analog or a mixed signal load.

12. The integrated switch mode power supply device of claim 1, wherein the air-cored inductor is connected to a first capacitor that is coupled in parallel with a second capacitor.

13. The integrated switch mode power supply device of claim 12 wherein the second capacitor is selected to minimize stray inductance.

14. The integrated switch mode power supply device of claim 13 wherein the second capacitor capacitance is selected to have a physical size that is sufficiently small to reduce an effect of stray inductance associated with the first capacitor.

15. A low pass filter circuit comprising:
   a first LC stage comprising a first inductor and a first capacitor that are connected together, wherein an input of the first LC stage is coupled to a switching regulator through an input of the low pass filter circuit, and wherein the first inductor comprises an air core;
   a second LC stage comprising a second inductor and a second capacitor that are connected together, wherein an input of the second LC stage is coupled to an output of the first LC stage, wherein the second inductor comprises a metal composite core or a ferrite core;
   wherein the first LC stage is configured to provide a gross attenuation of an alternating current (AC) signal present in the output of the switching regulator, whereby the air core of the first inductor prevents heat generation associated with the gross attenuation of the AC signal, and the second LC stage is configured to further attenuate the AC signal, wherein
   wherein the filter circuit is configured to filter a pulsed voltage to provide a regulated voltage to a load.

16. The low pass filter circuit of claim 15, further comprising:
   a third inductor and a third capacitor that is connected together and configured to provide a third LC stage, an input of the third LC stage being coupled to an output of the second LC stage, wherein the third inductor comprises a metal composite core or a ferrite core, and wherein the third LC stage is configured to further attenuate the AC signal by an amount sufficient to obtain the desired amount of ripple attenuation.

17. The low pass filter circuit of claim 15, wherein first LC stage further comprises a fourth capacitor that is connected to the air-cored inductor and coupled in parallel with the first capacitor.

* * * * *